March 1, 1966

R. B. MATTHEWS

Re. 25,976

FUEL CONTROL AND IGNITION SYSTEM

Original Filed June 30, 1959

INVENTOR.
RUSSELL B. MATTHEWS
BY
Joseph G. Schwallach
ATTORNEY

75

United States Patent Office

Re. 25,976
Reissued Mar. 1, 1966

25,976

FUEL CONTROL AND IGNITION SYSTEM

Russell R. Matthews, Oconomowoc, Wis., assignor, by mesne assignments, to Penn Controls, Inc., Goshen, Ind., a corporation of Delaware Original No. 3,151,661, dated Oct. 6, 1964, Ser. No. 823,898, June 30, 1959. Application for reissue May 12, 1965, Ser. No. 457,908
13 Claims. (Cl. 158—124)

Matter enclosed in heavy brackets [ ] appears in the original patent but forms no part of this reissue specification; matter printed in italics indicates the additions made by reissue.

This invention relates to improvements in fuel control and ignition systems for gaseous fuel burning apparatus and is particularly well adapted for use with clothes dryers or the like. The invention has, however, substantial utility in a wide variety of fluid fuel burning equipment.

It is the general object of the present invention to provide an improved fuel control and ignition system having a minimum of component parts and which is operable in a novel manner not only to afford safe ignition, but to insure shut-off of the fuel in the event of any abnormal condition.

Another object of the invention is to provide an improved fuel control and ignition system of the class described in which a high degree of safety is afforded by the fact that fuel flow to the main burner and flow of operative energy to the igniter cannot take place simultaneously.

Still another object of the invention is to provide an improved fuel control and ignition system of the aforementioned character in which thermal energy stored in the igniter prior to establishment of fuel flow to the main burner is utilized to effect ignition of the fuel upon establishment of such flow.

Still another object of the invention is to provide an improved system of the aforedescribed character which is well adapted for use in apparatus having a combustion box and having means for circulating air therethrough, the improved system affording purging of the combustion box of any unburned raw gas before fuel is supplied to the main burner.

A further object of the invention is to provide an improved fuel control and ignition system of the class described which is relatively simple in construction, and which is well adapted to fabrication by mass production techniques.

Other objects and advantages of the invention will become apparent as the description proceeds, reference being had to the drawing accompanying and forming a part of this specification. In the drawing, which illustrates three forms of the invention:

Figure 1:
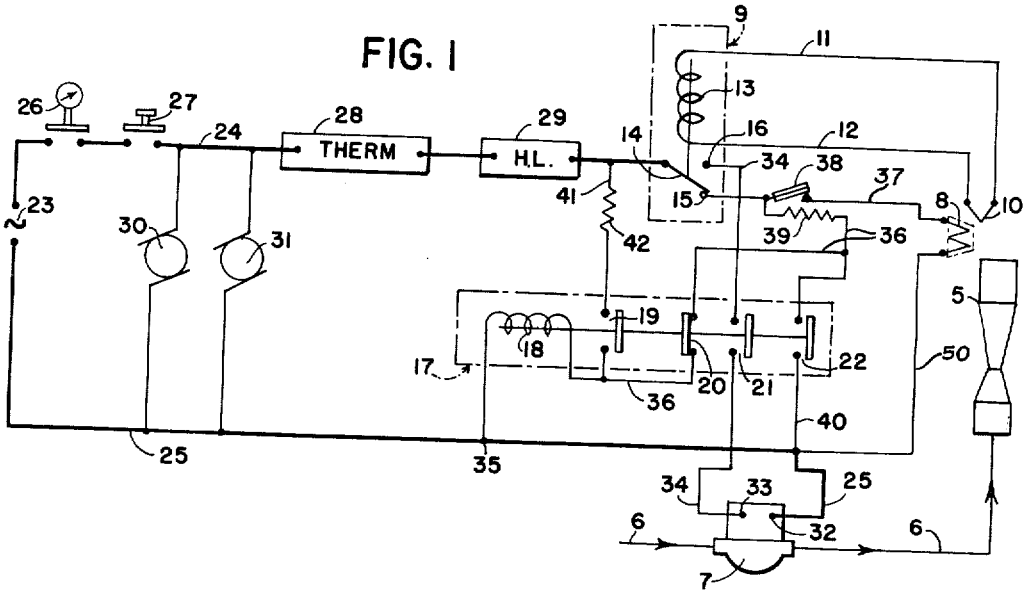
FIGURE 1 is a semi-diagrammatic illustration of one form of the improved fuel control and ignition system.

Referring now to FIGURE 1, the improved fuel control and ignition system comprises a main burner 5 which is preferably disposed within the combustion chamber (not shown) of fluid fuel burning apparatus which preferably has blower means (also not shown) for circulating air through the combustion chamber. The main burner 5 is supplied with fluid fuel through a conduit 6 having an electroresponsive valve means or valve 7 interposed therein. Mounted in igniting relation with fuel emitted from the burner 5 and offset from the path of the flame produced by burning of said emitted fuel is ignition means in the form of an electroresponsive igniter 8 preferably having substantial thermal mass as indicated diagrammatically by the dot nad dash lines thereof for a purpose which will hereinafter appear. One such igniter which has been found to be satisfactory for this purpose is an electrical resistance type igniter known commercially by the name "Globar."

Disposed adjacent the igniter 8 in a position to sense the temperature thereat is a temperature sensing element 10 of a temperature responsive control device 9 forming part of temperature responsive control means operatively related to the ignition means 8 and valve means 7 as will hereinafter appear. In FIGURE 1 the control device 9 takes the form of a relay, and the element 10 takes the form of a thermocouple which exhibits relatively acute sensitivity to temperature changes. The thermocouple 10 is connected by means of conductors 11 and 12 to the energizing coil 13 of relay 9, said relay being of the single pole double throw type in which a contact arm 14 normally engages a contact 15, and upon pull-in alternatively engages a contact 16. A line powered relay 17 is shown as having an energizing coil 18, normally open holding contacts 19, normally closed contacts 20, and normally open contacts 21 and 22.

Electrical energy is supplied to the improved system from an alternating current source 23 through line conductors 24 and 25. The line conductor 24 may have interposed therein a normally open time controlled switch 26, a normally open door switch 27, a thermostat 28 and a normally closed high temperature limit switch 29. Connected across the line conductors 24 and 25 as shown may be a motor 30 for powering the combustion chamber blower, and a motor 31 for driving the tumbling drum of the clothes dryer. Where suitable or desired, a single motor may be utilized to power both the blower and the drum. The end of the line conductor 24 remote from the source 23 is connected to the contact arm 14 of relay 9, and the end of the line conductor 25 remote from the source 23 is connected to one terminal 32 of the electroresponsive valve 7. The other terminal 33 of said valve is connected to the contacts 16 of the relay 9 by means of a conductor 34 in which the normally open contacts 21 of relay 17 are interposed.

One terminal of the igniter 8 is connected to the contact 15 of relay 9 by a conductor 37 which has a normally closed warp switch 38 interposed therein. The other terminal of the igniter 8 is connected to the line conductor 25 by a conductor 50 as shown. One end of the winding 18 of relay 17 is connected to the line conductor 25, as at 35, and the other end of said relay coil is connected to the terminal of the warp switch 38 nearest the relay contact 15 by means of a conductor 36 which has normally closed relay contacts 20 and a warp switch heater 39 interposed therein. The heater 39 may be of the electrical resistance type and is disposed in heating relation with the warp switch 38. A conductor 40 has the normally open relay contacts 22 interposed therein and connects the line conductor 25 to the conductor 36 as shown. A conductor 41 connects the conductor 26 to the line conductor 24 as shown, and has the normally open holding contacts 19 interposed therein, along with a voltage dropping resistance 42.

The illustrated fuel control and ignition system is placed into operation by closure of the door switch 27 and setting of the time switch 26, which setting is effective to close the contacts thereof and hold the same closed for a preselected period normally sufficient to completely dry a load of clothes placed in the dryer drum. Closure of switches 26 and 27 effects operation of the blower motor 30 and drum motor 31 and causes initial energization of the igniter 8 and relay coil 18, the latter being energized by current flow through the line conductor 24, contact arm 14, contact 15, warp switch heater 39, conductor 36, closed relay contacts 20, relay coil 18 and line conductor 25. This current flow causes pull-in of the relay 17 and at the same time proves the warp switch heater 39, since an open circuit in said heater would prevent energization of the relay coil 18 and pull-in of the relay 17. The igniter 8 is energized by current flow through line conductor 24, contact arm 14, contact 15, warp switch 38, conductor 37, igniter 8, conductor 50 and line conductor 25.

Upon pull-in of the relay 17, energization of the winding 18 is by way of the conductor 41 including the voltage dropping resistor 42 and the now closed holding contacts 19. The resistor 42 has a resistance approximately equal to that of the warp switch heater 39 and prevents an over voltage from being placed upon the relay coil 18. Switch pull-in of the relay 17, energization of the warp switch heater 39 is by way of conductor 40 and now closed contacts 22 connecting the conductor 36 to the line conductor 25.

Relatively large thermal mass in the igniter 8 slows warmup thereof and may provide a period of from fifteen to twenty seconds before a minimum fuel ignition temperature is reached thereat during which the air circulating blower can purge the combustion box of any raw unburned gas. The thermocouple 10 senses the temperature at the igniter 8, and upon attainment thereat of a predetermined temperature above a minimum fuel ignition temperature, the thermocouple 10 generates sufficient electrical energy to effect pull-in of the relay 9. This causes disengagement of the contact arm 14 from the contact 15 and subsequent engagement of said arm with the contact 16.

Opening of the circuit at the contact 15 interrupts energization of the igniter 8 and the warp switch heater 39, whereas making of the circuit at the contact 16 effects energization of the electro-responsive valve 7 by connection thereof across the line conductors 24 and 25 through conductor 34 and now closed contacts 21. In response to such energization, the valve 7 opens to permit fuel to flow to the burner 5. The thermal energy stored in the igniter 8 is utilized for ignition of the fuel, and sufficient thermal energy is available at the igniter to afford maintenance thereat of a temperature above the minimum fuel ignition temperature for a predetermined period following actuation of the valve 7, said period being normally of such duration as to ignite the emitted fuel by said thermal energy. Thus, ignition takes place even though the igniter 8 is not electrically energized at the time. Once the main burner 5 is ignited, the thermocouple 10 receives sufficient heat from the burning fuel to hold the relay 9 pull-in for continuous operation.

The relay 17 affords the improved system a unique interlock providing a safety function preventing a dangerous condition in the event of momentary interruption of current flow to the valve 7. If such interruption should take place, for example by opening the dryer door and immediately reclosing the same to thereby similarly actuate the door switch 27, the momentary closure of the valve 7 would cause outage of the burner 5. If the valve 7 were to then reopen immediately, raw unburned gas would flow from the burner 5 without being ignited by the igniter which is now de-energized and therefore cooled to below the minimum ignition temperature. The flow of unburned gas would continue until the thermocouple 10 is cooled sufficiently to effect dropout of the relay 9 and opening of the circuit to valve 7 at the contact 16 for de-energization and closure of said valve. With the improved system, as soon as any one of the switches 26 to 29 is opened, the relay coil 18 is deenergized and the relay 17 drops out, opening the contacts 21 and deenergizing the valve 7 for closure thereof. Now, even though the momentarily opened one of switches 26 to 29 is immediately reclosed, the fuel valve 7 cannot be reopened until the thermocouple 10 has cooled sufficiently to effect dropout of the relay 9 and making of the circuit at the contact 15 for initation of a new ignition cycle.

The warp switch 38 is provided to shut off the system in the event of a predetermined number of unsuccessful ignition cycles caused, for example, by a situation in which the igniter 8, because of low line voltage, does not get hot enough to ignite the gas issuing from the burner 5 but possesses sufficient heat to cause the thermocouple 10 to pull in the relay 9. Since every time the relay 9 pulls in gas flow from the burner 5 for approximately fifteen seconds until the thermocouple 10 cools sufficiently to drop out the relay 9, a large number of such unsuccessful ignition cycles could possibly create a dangerous mixture of unburned gases in the combustion chamber. With the warp switch heater 39 in parallel circuit relation with the igniter 8 as shown, each time the igniter 8 is energized, the heater 39 supplies heat to the warp switch 38. After a predetermined number of unsuccessful ignition cycles, the heat supplied by the warp switch heater raises the temperature of the warp switch 38 sufficiently to warp the same to open-circuit position, and it remains in this position until manually reset. With the igniter circuit opened at the warp switch 38, the igniter cannot be energized, and, of course, the relay 9 cannot be pulled-in for actuation of the fuel valve 7, since the thermocouple 10 is not supplied with heat.

In each ignition cycle a predetermined period of time is allowed for the ignition to take place, and if ignition is unsuccessful, the system is shut down. For example if there is air in the fuel line preventing proper ignition at the burner 5 within the prescribed time period, the relay 9 will drop out. Similarly, if the voltage delivered to the igniter 8 should be so low that the igniter is incapable of heating the thermocouple 10 sufficiently to effect pull-in of the relay 9, no gas would be admitted to the burner 5 because the valve 7 would remain deenergized. The improved system therefore prevents fuel flow to the burner 5 in the event of abnormal fuel or electrical conditions.

Figure 2:
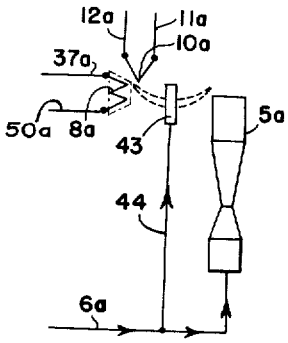
FIGURE 2 is a fragmentary semi-diagrammatic illustration of another form of the improved fuel control and ignition system.

FIGURE 2 fragmentarily illustrates another from of the invention in which the parts indicated by reference characters having a suffix "a" correspond to parts in FIGURE 1 indicated by the same reference characters without a suffix. In the modification of FIGURE 2, the parts shown therein are adapted to replace the corresponding parts in FIGURE 1. In FIGURE 2 a pilot burner 43 is supplied with fuel from the conduit 6a through conduit 44 and functions to provide what is known as "carry over" ignition between the igniter 8a and the main burner 5a. The pilot burner 43 receives fuel whenever the main burner 5a receives fuel. The operation of the form of the invention shown in FIGURE 2 is substantially the same as that shown in FIGURE 1 except that during an ignition cycle the heat of the igniter 8a ignites the fuel issuing from the pilot burner 43, and upon ignition of the pilot burner, the flame thereof affords ignition of the fuel issuing from the main burner 5a. So long as the pilot burner is properly functioning, the heat of burning fuel thereat maintains the thermocouple 10a sufficiently heated to hold in the relay 9.

The use of the intermediate ignition means afforded by the pilot burner 43 in FIGURE 2 has the advantage that instead of igniting the fuel issuing from a large gas burner, only the fuel issuing from the pilot burner 43 is ignited by the heat of the igniter 8a. Being a relatively small burner, the flame characteristics of the pilot burner 43 are readily controllable and predictable. Also, experience has shown that in the form of the invention shown in FIGURE 2 a platinum wire type igniter having smaller thermal mass than the igniter 8 of FIGURE 1 can be utilized. It is believed that the maintenance of ignition temperatures at such an igniter for the predetermined period following opening of the fuel valve is aided by the generation of heat at the igniter due to the catalytic action of the gas from the pilot burner contacting the hot platinum coil of the igniter.

Figure 3:
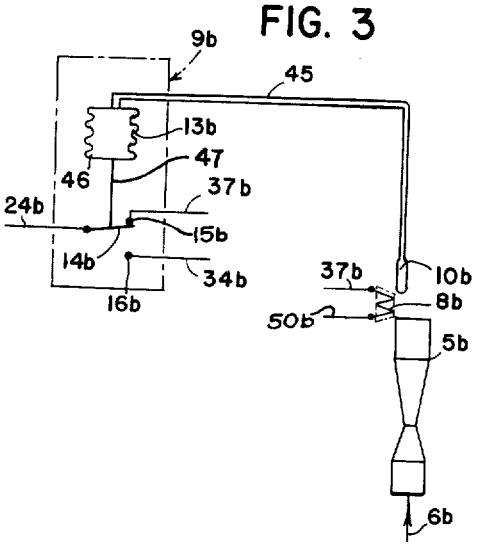
FIGURE 3 is a fragmentary semi-diagrammatic illustration of still another form of the improved fuel control and ignition system.

FIGURE 3 fragmentarily illustrates still another form of the invention in which the contact actuating means of the temperature sensitive relay 9b takes the form of an expansible and contractible bellows 13b connected by a capillary tube 45 to a temperature sensing bulb 10b. The contact making arm 14b is connected to a movable wall 46 of the bellows 13b by a contact actuating arm 47. The bellows 13b, tube 45 and bulb 10b contain a temperature responsive expansible and contractible fluid fill which may be either the vapor pressure or the hydraulic type. One hydraulic type fill which may be used in mercury. Obviously other thermostatic contact actuating means may be used in the relay 9b where suitable or desired, and said relay may, if desired, be provided with snap acting means (not shown).

The operation of the form of the invention shown in FIGURE 3 is substantially identical with that shown in FIGURE 1, the position of the relay 9a shown in FIGURE 3 corresponding to the dropout position of the relay 9 in FIGURE 1. An increase in the temperature at the igniter 8b sensed by the bulb 10b causes expansion of the fill within said bulb, tube and bellows, such that attainment of the predetermined temperature above the minimum ignition temperature at igniter 8b causes the bellows 13b to be expanded sufficiently to move the contact arm 14b into engagement with the contact 16b. Upon subsequent cooling of the bulb 10b, contraction of the bellows 13b effects return of the contact arm 14b into engagement with the contact 15b.

Having thus described the three specific embodiments of the present invention, it is to be understood that these forms have been selected to facilitate the disclosure rather than to limit the number of forms which the invention may assume. Various modifications, adaptations, and alterations may be applied to the specific forms shown to meet the requirements of practice, without in any manner departing from the spirit or scope of the present invention, and all of such modifications, adaptations and alterations are contemplated as may come within the scope of the appended claims.

What is claimed as the invention is:

[1. A fuel control and ignition system comprising a gaseous fuel burner, normally closed valve means controlling the flow of gaseous fuel to said burner, ignition means in igniting relation with said burner and having substantial thermal mass, and temperature responsive control means operatively related to said ignition means and to said valve means and having a temperature sensing element positioned to be heated by said ignition means, said control means being operable to initially afford flow of operative energy to said ignition means and also being operable responsive to attainment by said ignition means of a predetermined temperature level above a minimum fuel ignition temperature effected solely by said flow of operative energy thereto to terminate said flow of operative energy and actuate said valve means to open position to initiate fuel flow to said burner, but only after the flow of said operative energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner.]

2. A fuel control and ignition system comprising a gaseous fuel burner, normally closed valve means controlling the flow of gaseous fuel to said burner, ignition means in igniting relation with said burner and having substantial thermal mass, and temperature responsive control means operatively related to said ignition means and to said valve means and having a temperature sensing element positioned to be heated by said ignition means, said control means being operable to initially afford flow of operative energy to said ignition means and also being operable responsive to attainment by said ignition means of a predetermined temperature level above a minimum fuel ignition temperature effected solely by said flow of operative energy thereto to terminate said flow of operative energy and actuate said valve means to open position to initiate fuel flow to said burner, but only after the flow of said operative energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, said ignition means being so disposed with respect to said burner that upon expiration of said predetermined period said ignition means is normally cooled to below said minimum fuel ignition temperature and remains at said temperature irrespective of whether or not ignition of the emitted fuel has been effected until a new ignition cycle is initiated.

3. A fuel control and ignition system comprising a gaseous fuel burner, normally closed electroresponsive valve means controlling the flow of gaseous fuel to said burner, electroresponsive ignition means in igniting relation with said burner and having substantial thermal mass, and temperature responsive control means comprising a temperature responsive relay having contacts in circuit with said ignition means and with said valve means and having a temperature sensing element positioned to be heated by said ignition means, said relay being operable to initially afford flow of electrical energy to said ignition means and also being operable responsive to attainment by said ignition means of a predetermined temperature level above a minimum fuel ignition temperature effected solely by said flow of operative energy thereto to terminate said flow of electrical energy and sequentially establish the flow of electrical energy to said valve means for actuation thereof to open position initiating fuel flow to said burner, but only after the flow of said electrical energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, *said ignition means being so disposed with respect to said burner that upon expiration of said predetermined period said ignition means is normally cooled to below said minimum fuel ignition temperature and remains below said minimum temperature irrespective of whether or not ignition of the emitted fuel has been effected until a new ignition cycle is initiated.*

4. A fuel control and ignition system according to claim 3 wherein the temperature responsive relay is electromagnetic and the temperature sensing element comprises a thermoelectric generator connected to power said relay.

5. A fuel control and ignition system according to claim 3 wherein the temperature responsive relay is of the thermal expansion type and the temperature sensing element comprises a bulb connected to said relay by a capillary tube.

6. A fuel control and ignition system comprising a gaseous fuel burner, normally closed electroresponsive valve means controlling the flow of gaseous fuel to said burner electroresponsive ignition means in igniting relation with said burner and having substantial thermal mass, and temperature responsive control means comprising a temperature responsive first relay having contacts in circuit with said ignition means and with said valve means and having a temperature sensing element positioned to be heated by said ignition means, said relay being operable to initially afford flow of electrical energy to said ignition means and also being operable responsive to attainment by said ignition means of a predetermined temperature level above a minimum fuel ignition temperature effected solely by said flow of operative energy thereto to terminate said flow of electrical energy and sequentially establish the flow of electrical energy to said valve means for actuation thereof to open position initiating fuel flow to said burner, but only after the flow of said electrical energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, *said ignition means being so disposed with respect to said burner that upon expiration of said predetermined period said ignition means is normally cooled to below said minimum fuel ignition temperature and remains below said minimum temperature irrespective of whether or not ignition of the emitted fuel has been effected until a new ignition cycle is initiated,* said control means also including interlock means comprising a second relay having contacts in circuit with said valve means and with the contacts of said first relay and operable upon interruption of the flow of electrical energy to said valve means following ignition of the fuel to prevent re-establishment of the flow of electrical energy to said valve means until after the temperature at said sensing element has dropped below said predetermined minimum ignition temperature to initiate a new ignition cycle and also after the flow of electrical energy to said ignition means has been terminated in said new cycle responsive to heating of said igniton means to said predetermined level.

7. For use with fuel burning apparatus having a combustion chamber and a gaseous fuel burner within said chamber, the combination of a blower for circulating air through said combustion chamber, and a fuel control and ignition system comprising a normally closed valve controlling the flow of gaseous fuel to said burner, ignition means in igniting relation with said burner and having substantial thermal mass, and temperature responsive control means operatively related to said blower, said ignition means and said valve and having a temperature sensing element positioned to be heated by said ignition means, said control means being operable initially to afford flow of operative energy to said ignition means during operation of said blower and also being operable responsive to attainment by said ignition means of a predetermined temperature level above a minimum fuel ignition temperature effected solely by said flow of operative energy thereto to terminate said flow of operative energy and actuate said valve to open position to initiate fuel flow to said burner, but only after the flow of said operative energy to said ignition means has been terminated, the thermal mass of said ignition means when cool affording a time delay in which purging of said combustion chamber of unburned gaseous fuel by said blower is accomplished before said predetermined temperature is sensed and fuel flow is initiated, the thermal mass of said ignition means when thus heated being sufficient to afford maintenance thereat of a temperature above said minimum fuel ignition temperature for a predetermined period following opening of said valve, said period being normally of such duration as to ignite the fuel emitted from said burner, *said ignition means being so disposed with respect to said burner that upon expiration of said predetermined period said ignition means is normally cooled to below said minimum fuel ignition temperature and remains below said minimum temperature irrespective of whether or not ignition of the emitted fuel has been effected until a new ignition cycle is initiated.*

8. A fuel control and ignition system comprising a gaseous fuel burner, normally closed electroresponsive valve means controlling the flow of gaseous fuel to said burner, electroresponsive ignition means in igniting relation with said burner and having substantial thermal mass, and temperature responsive control means comprising a temperature responsive first relay having contacts in circuit with said ignition means and with said valve means and having a temperature sensing element positioned to be heated by said ignition means, said relay being operable to initially afford flow of elctrical energy to said ignition means and also being operable responsive to attainment by said ignition means of a predetermined temperature level above a minimum fuel ignition temperature effected solely by said flow of operative energy thereto to terminate said flow of electrical energy and sequentially establish the flow of electrical energy to said valve means for actuation thereof to open position initiating fuel flow to said burner, but only after the flow of said electrical energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, said ignition means being so disposed with respect to said burner that upon expiration of said predetermined period said ignition means is normally cooled to below said minimum fuel ignition temperature and remains at said temperature irrespective of whether or not ignition of the emitted fuel has been effected until a new ignition cycle is initiated, said control means also including interlock means comprising a second relay having contacts in circuit with said valve means and with the contacts of said first relay and operable upon interruption of the flow of electrical energy to said valve means following ignition of the fuel to prevent re-establishment of the flow of electrical energy to said valve means until after the temperature at said sensing element has dropped below said predetermined minimum ignition temperature to initiate a new ignition cycle and also after the flow of electrical energy to said ignition means has been terminated in said new cycle responsive to heating of said ignition means to said predetermined level.

*9. A fuel control and ignition system, comprising a fuel burner, means operable for feeding fuel to said burner, ignition means in igniting relation with said burner and energizable for igniting fuel fed thereto, and control means operatively related to said ignition means and to said feeding means and having a sensing element responsive to energization of said ignition means, said control means being operable to afford initially flow of operative energy to said ignition means and also being operably responsive to detection by said sensing element of attainment by said ignition means of a predetermined energization level above a minimum fuel ignition level effected solely by said flow of operative energy thereto to terminate said flow of operative energy and actuate said fuel feeding means to fuel feeding condition initiating fuel feeding to said burner, said ignition means being of a thermal mass selected as being sufficient to afford, following said actuation of said feeding means, sufficient energy normally to ignite the*

*fuel emitted from said burner, said ignition means being so disposed with respect to said burner that after the expiration of a predetermined ignition period measured from the said termination of said flow of operative energy said ignition means cool to an energy level that is sufficient to ignite said fuel regardless of whether or not ignition of the emitted fuel has been effected and remains thereat until a new ignition trial is initiated.*

*10. A fuel control and ignition system, comprising a fuel burner, means operable for feeding fuel to said burner, ignition means in igniting relation with said burner and energizable for igniting fuel fed thereto, and control means operatively related to said ignition means and to said feeding means and having an energy sensing element positioned to detect the attainment by said ignition means of a predetermined energy level above a minimum fuel ignition energy level, said control means being operable to afford initially flow of operative energy to said ignition means and further being operably responsive to said detection by said sensing element to terminate said flow of operative energy and actuate said fuel feeding means to fuel feeding condition initiating fuel feeding to said burner, but only after the flow of said operative energy to said ignition means has been terminated, said ignition means being of a thermal mass selected as being sufficient to afford maintenance thereat at an energy level above said minimum fuel ignition level for a predetermined period following said actuation of said feeding means, said period being normally of such duration as to ignite the fuel emitted from said burner, said ignition means being disposed with respect to said burner that at the expiration of said predetermined ignition period said ignition means cools to an energy level insufficient to cause ignition of said fuel and remains thereat irrespective of whether or not ignition of the emitted fuel has been effected until a new ignition trial is initiated.*

*11. A fuel control and ignition system comprising a fuel burner, electroresponsive means operable for feeding fuel to said burner, electroresponsive ignition means in igniting relation with said burner, and control means comprising a relay having contacts in circuit with said ignition means and with said feeding means and having means for sensing energization of said ignition means, said relay being operable to afford initially flow of electrical energizing energy to said ignition means and further being operably responsive to detection by said sensing means of attainment by said ignition means of a predetermined energy level above a minimum fuel ignition level effected solely by said flow of operative energy thereto to terminate said flow of electrical energy and sequentially establish the flow of electrical energy to said feeding means for actuation thereof to initiate fuel flow to said burner, the thermal mass of said ignition means being selected to afford, after said termination, sufficient energy normally to ignite the fuel emitted from said burner, said ignition means being so disposed with respect to said burner that after the expiration of a predetermined ignition period measured from the said termination of said flow of operative energy said ignition means cool to an energy level that is sufficient to ignite said fuel regardless of whether or not ignition of the emitted fuel has been effected and remains thereat until a new ignition trial is initiated.*

*12. A fuel control and ignition system comprising a gaseous fuel burner, normally closed electroresponsive valve means controlling the flow of gaseous fuel to said burner, electroresponsive ignition means in igniting relation with said burner, and control means comprising a relay having contacts in circuit with said ignition means and with said valve means and having means for sensing energization of said ignition means, said relay being operable to afford initially flow of electrical energizing energy to said ignition means and also being operably responsive to detection by said sensing means of attainment by said ignition means of a predetermined energy level above a minimum fuel ignition level effected solely by said flow of operative energy thereto to terminate said flow of electrical energy and sequentially establish the flow of electrical energy to said valve means for actuation thereof to open position initiating fuel flow to said burner, the thermal mass of said ignition means being selected to afford, after said termination, sufficient energy normally to ignite the fuel emitted from said burner, said ignition means being so disposed with respect to said burner that after the expiration of a predetermined ignition period measured from the said termination of said flow of operative energy said ignition means cool to an energy level that is sufficient to ignite said fuel regardless of whether or not ignition of the emitted fuel has been effected and remains thereat until a new ignition trial is initiated.*

*13. A fuel control and ignition system comprising a fluid fuel burner, normally closed valve means controlling the flow of fluid fuel to said burner, ignition means in igniting relation with said burner and having substantial thermal mass, and temperature responsive control means operatively related to said ignition means and to said valve means and having a sensing element positioned for sensing the energization of said ignition means, said control means being operable to afford initially flow of operative energy to said ignition means and also being operably responsive to detection by said sensing element of attainment by said ignition means of a predetermined temperature level above a minimum fuel ignition temperature effected solely by said flow of operative energy thereto to terminate said flow of operative energy and actuate said valve means to open position to initiate fuel flow to said burner, but only after the flow of said operative energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, said ignition means being so disposed with respect to said burner that upon expiration of said predetermined period said ignition means is normally cooled to below said minimum fuel ignition temperature and remains below said minimum temperature irrespective of whether or not ignition of the emitted fuel has been effected until a new ignition cycle is initiated.*

*14. A fuel control and ignition system comprising a gaseous fuel burner, normally closed electroresponsive valve means controlling the flow of gaseous fuel to said burner, electroresponsive ignition means in igniting relation with said burner and having substantial thermal mass, and temperature responsive control means comprising a relay having contacts in circuit with said ignition means and with said valve means and having a sensing element positioned for sensing the energization of said ignition means, said relay being operable to afford initially flow of electrical energy to said ignition means and also being operably responsive to detection by said sensing means of attainment by said ignition means of a predetermined temperature level above a minimum fuel ignition temperature effected solely by said flow of operative energy thereto to terminate said flow of electrical energy and sequentially establish the flow of electrical energy to said valve means for actuation thereof to open position initiating fuel flow to said burner, but only after the flow of said electrical energy to said ignition means has been terminated, the thermal mass of said ignition means thus heated being sufficient to afford maintenance thereat of a temperature above said minimum fuel ignition temperature for a predetermined period following opening of said valve means, said period being normally of such duration as to ignite the fuel emitted from said burner, said ignition means being so disposed with respect to said burner that upon expiration of said predeter-*

*mined period said ignition means is normally cooled to below said minimum fuel ignition temperature and remains below said minimum temperature irrespective of whether or not ignition of the emitted fuel has been effected until a new ignition cycle is initiated.*

References Cited by the Examiner

The following references, cited by the Examiner, are of record in the patented file of this patent or the original patent.

UNITED STATES PATENTS

| | | | |
|---|---|---|---|
| 1,985,991 | 1/1935 | Harrington | 158—28 |
| 2,159,658 | 5/1939 | Hall | 158—28 |
| 2,268,959 | 1/1942 | Ray | 158—131 |
| 2,730,169 | 1/1956 | Deubel | 158—125 |
| 2,747,799 | 5/1956 | Schultz et al. | 158—910.2 X |
| 2,768,676 | 10/1956 | Deubel | 158—28 |

FREDERICK KETTERER, *Primary Examiner.*

UNITED STATES PATENT OFFICE

CERTIFICATE OF CORRECTION

Reissue No. 25,976

March 1, 1966

Russell B. Matthews

It is certified that error appears in the above identified patent and that said Letters Patent are hereby corrected as shown below:

Column 9, lines 5 and 60 and column 10, line 13, "sufficient", each occurrence, should read -- insufficient --.

Signed and sealed this 10th day of March 1970.

(SEAL)
Attest:

Edward M. Fletcher, Jr.
Attesting Officer

WILLIAM E. SCHUYLER, JR.
Commissioner of Patents